United States Patent Office 2,917,067
Patented Dec. 15, 1959

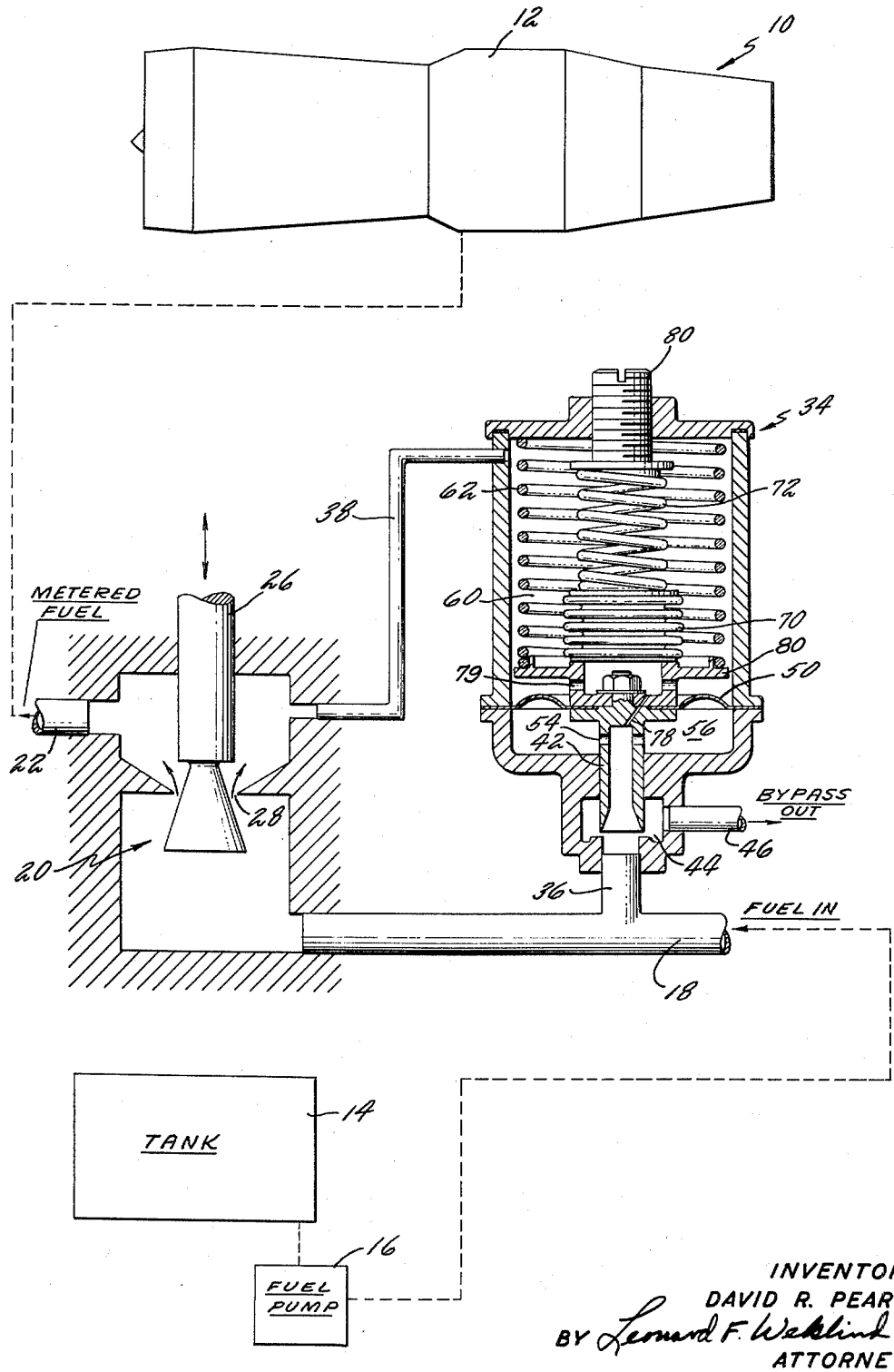

2,917,067
TEMPERATURE COMPENSATED REGULATOR

David R. Pearl, West Hartford, Conn., assignor to United Aircraft Corporation, East Hartford, Conn., a corporation of Delaware Application September 21, 1956, Serial No. 611,240

1 Claim. (Cl. 137—115)

This invention relates to fluid flow regulating devices and more particularly temperature compensation for such devices.

It is an object of this invention to provide a temperature compensating mechanism for a fluid flow regulating valve such as a main throttle valve in a fuel line.

It is another object of this invention to provide a throttle valve with a temperature compensated pressure regulating valve wherein the temperature compensation is nonlinear.

These and other objects of this invention will become readily apparent from the following detailed description of the drawing.

The drawing is a partial schematic and partial enlarged detailed cross section of the throttle valve and pressure regulating device of this invention.

It is known that the general equations for fluid flow may be written as follows:

$$Q = CA\sqrt{\frac{\Delta P}{d}}$$

$$Q' = CA\sqrt{\Delta P d}$$

where $Q$ = fuel flow by volume
$Q'$ = fuel flow by weight
$\Delta P$ = pressure drop across the throttle valve
$A$ = area of the main throttle valve
$d$ = density
$C$ = appropriate constant From the equation it is seen that substantially incompressible fuel flow, whether considered on a weight or volume basis, is a function of fuel density.

In a fuel metering device, as presently described, as fluid temperature increases, density decreases. Therefore, if no compensation existed, weight flow $Q' = C\sqrt{\Delta P d}$ would decrease and volume flow $$Q = C\sqrt{\frac{\Delta P}{d}}$$

would increase as fuel temperature increased and vice versa.

Temperature compensation, which results in changing the throttling area by moving the contoured plug with respect to the orifice, changes fuel flow by a constant increment regardless of actual fuel flow. This can at best only approximate a true correction for all values of fuel flow.

In contrast, this invention changes the factor $\Delta P$ in either the weight flow or volume flow equation so that the correction applied is a constant percentage of fuel flow for any fixed fuel temperature. Therefore, by proper variation of $\Delta P$ with fuel temperature change an exact correction is possible to maintain either constant weight flow or constant volume flow as desired. The essence of this invention is that there be a spring biasing a pressure regulating valve and that the spring force be varied by a temperature sensitive device, so that the level of pressure regulation is consequently varied.

Since a spring is pertinent to the device, another effect should be mentioned. It is a universal property of metal springs that the modulus of elasticity and the physical dimensions change with temperature. If the spring is in the fuel being metered, these changes in physical properties with temperature result in a change in regulated pressure and hence an error in flow through the metering orifice. The temperature compensating device proposed by this invention can also compensate for this variation in spring load by the means described above. Where these variations with modulus of elasticity or fuel density are not linear with temperature, the temperature compensating member can act through cams to vary the height and, therefore, the load on the biasing spring in accordance with any desired schedule.

This invention will work equally well with a throttling type pressure regulating valve, in short any spring biased pressure regulating valve.

Referring to the drawing, a typical fluid consuming device as for example, a turbine type engine 10 is illustrated as having a combustion chamber 12. Fuel or other fluid under pressure is obtained from a tank 14, passed to a fuel pump 16 then to a main line 18 through the throttle valve 20 and thence to the outlet line 22 leading to the combustion chamber 12. The throttle valve 20 has a main stem 26 for varying the area of the orifice 28 to regulate the amount of fuel flow. In order that any given position of the throttle valve stem 26 will give a predetermined fuel flow, a pressure regulator is generally indicated at 34. The pressure regulator 34 senses the pressure upstream of the throttle valve by means of a pipe 36 and the pressure downstream of the throttle valve by means of a line 38. Broadly speaking, the pressure regulating valve senses the upstream and downstream pressures just mentioned and positions a bypass valve element 42 to vary the opening of an orifice 44 which bypasses fuel from the line 36 to an outlet line 46. By bypassing a certain amount of the fuel the pressure drop across the main throttle valve 20 is maintained relatively constant. The valve element 42 is positioned by the pressure difference across a diaphragm 50. Fluid pressure upstream of the throttle valve passes through the line 36 through the ports 54 and into the chamber 56 on the bottom side of the diaphragm 50. Likewise, fluid under pressure from the downstream side of the throttle valve is fed by the line 38 to the chamber 60 on the top side of the diaphragm 50.

Pressure in the chamber 60 as well as the spring 62 urges the valve element 42 toward a closed position, while pressure in the chamber 56 urges the valve stem 42 toward an open position.

In order to compensate for the temperature of the fuel being regulated, a bellows 70 is provided. The bellows 70 is filled with a suitable fluid which provides a sufficient expansion and contraction with variations in temperature. The bellows 70 and the adjustable spring 72 vary the force on the valve element 42 to compensate for variations in temperature of the fuel. Hence, the valve element 42 will be readjusted with changes in fuel temperature so that the pressure drop being maintained across the throttle valve 20 will be adjusted properly.

In order to insure a sufficient circulation of fresh fuel to the area surrounding the bellows 70, a bleed passage 78 is provided. A certain amount of fuel will then pass from the pipe 36 through the bleed 78 then through the ports 79 in the retainer 80, to the chamber 60 and out to the line 38 to the lower pressure area on the downstream side of the throttle valve. The bleed 78 is so small that it will not materially affect the pressure differential across the diaphragm 50. The retainer 80 engages and positions the lower portion of the bellows 50 and spring 62.

As a result of this invention it is apparent that temperature compensation may be provided for a fuel control device such as a metering or throttle valve in a simple yet efficient manner.

Furthermore, the corrective bias on the pressure drop across the throttle valve is maintained as a square root function so that the correction for fuel flow will be more exact.

Although only one embodiment of this invention has been illustrated and described herein, it will be apparent that various changes may be made in the construction and arrangement of the various parts without departing from this novel concept.

What it is desired to obtain by Letters Patent is:

In a fluid flow control system having a source of substantially non-compressible fluid under pressure and having a fluid consuming device; a non-compressible fluid flow line and means for regulating the flow of fluid therein including a variable area orifice in said flow line, means for maintaining substantially constant the pressure drop across said orifice including fluid connections to the upstream and downstream sides of said variable orifice, said pressure regulating means including a valve connected in parallel with said orifice for bypassing fluid around said orifice, a diaphragm for moving said valve, a spring and the pressure on the downstream side of said orifice biasing said valve and diaphragm in a valve closed direction, fluid pressure from the upstream side of said variable orifice for urging said valve and diaphragm in a valve open position, said spring being exposed to the fluid being controlled, a fluid filled expansible bellows forming a variable length connection between said valve and said spring, said bellows being exposed to the fluid being controlled for varying the bias produced by said spring in response to changes in temperature of the fluid for varying said constant pressure drop, and a relatively small fixed bleed across said diaphragm to provide a predetermined circulation of fluid from the upstream side of said variable orifice across said bellows.

References Cited in the file of this patent

UNITED STATES PATENTS

| | | |
|---|---|---|
| 1,712,460 | Purdy et al. | May 7, 1929 |
| 1,873,769 | Lang | Aug. 23, 1932 |
| 1,941,023 | Smith | Dec. 26, 1933 |
| 2,445,544 | Trautman | July 20, 1948 |
| 2,590,111 | MacCracken et al. | Mar. 25, 1952 |
| 2,644,482 | McCallum | July 7, 1953 |
| 2,649,688 | Slomer | Aug. 25, 1953 |
| 2,705,047 | Williams et al. | Mar. 29, 1955 |
| 2,733,865 | Ehlke | Feb. 7, 1956 |
| 2,806,519 | Basford et al. | Sept. 17, 1957 |

FOREIGN PATENTS

| | | |
|---|---|---|
| 250,165 | Switzerland | Jan. 21, 1946 |